United States Patent
Verma et al.

(10) Patent No.: US 7,024,197 B2
(45) Date of Patent: Apr. 4, 2006

(54) WIRELESS MID-CALL TRANSFERS

(75) Inventors: Charu Verma, Darien, IL (US);
Mariana Benitez Palaez, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 395 days.

(21) Appl. No.: 10/378,312

(22) Filed: Mar. 3, 2003

(65) Prior Publication Data

US 2004/0176084 A1    Sep. 9, 2004

(51) Int. Cl.
*H04Q 7/20*    (2006.01)

(52) U.S. Cl. .................... 455/445; 455/435.1; 370/338

(58) Field of Classification Search ............. 455/432.1, 455/432.2, 432.3, 435.3

See application file for complete search history.

(56) References Cited

U.S. PATENT DOCUMENTS

| | | | |
|---|---|---|---|
| 5,867,784 A | 2/1999 | Lantto | 455/432 |
| 5,949,579 A * | 9/1999 | Baker | 359/612 |
| 6,345,184 B1 * | 2/2002 | van der Salm et al. | 455/432.2 |
| 6,370,379 B1 * | 4/2002 | Rugaard | 455/435.1 |
| 6,519,454 B1 | 2/2003 | Calabrese et al. | 455/432 |
| 6,640,108 B1 * | 10/2003 | Lu et al. | 455/463 |
| 6,725,058 B1 * | 4/2004 | Rinne et al. | 455/553.1 |
| 6,745,029 B1 * | 6/2004 | Lahtinen | 455/432.1 |
| 2001/0031635 A1 * | 10/2001 | Bharatia | 455/432 |
| 2002/0115441 A1 * | 8/2002 | Alonso et al. | 455/445 |
| 2003/0162544 A1 * | 8/2003 | Austin et al. | 455/445 |

* cited by examiner

*Primary Examiner*—Creighton Smith

(57) ABSTRACT

A method of transferring a call established between a first communications device and a second communications device from the second communications device to a third communications device. The method includes negotiating media description between the first communications device and the third communications device to establish a transferred call capable of handling media which can be different than that handled by the original call.

16 Claims, 2 Drawing Sheets

WIRELESS MID-CALL TRANSFERS

BACKGROUND OF THE INVENTION

The present invention relates to a system and method for transferring calls in a wireless communications system, and more particularly to a system and method of negotiating bearer attributes while transferring a call.

A "call transfer" is a common phone service in which one of the parties can transfer the call from one telephone to another telephone. Calls can be transferred to wireless communications devices, either from landline communication devices or from other wireless communications devices.

However, wireless communications devices can vary in their ability to receive and transmit media other than voice. Older wireless devices, such as 2G cellular phones, can only provide voice communication and cannot receive and transmit media other than voice (e.g. multimedia). Newer wireless devices such as $3^{rd}$ Generation Partnership Project 3GPP and 3GPP2 devices can handle various media such as data, text, special application, video, etc., as well as voice communications.

Known systems and methods of transferring calls between devices having different media handling capabilities can result in not exploiting the functionality/capabilities of the devices. The media description of the devices involved in the original call defining their media handling capabilities is passed on to the device receiving the transferred. For example, the media description of a call transferred from a 2G device to a 3G device is not changed during the transfer to accommodate the range of media handling attributes of the 3G device. Therefore, the 3G device is limited to the media attributes established in the original call and may not be able to utilize it's full range of media handling attributes.

It is desirable to enable a wireless device receiving a transferred call to fully utilize it's media handling attributes.

SUMMARY OF THE INVENTION

According to the present invention, a method of wireless mid-call transfers is provided.

In accordance with one aspect of the present invention, a method of transferring a call established between a first communications device and a second communications device from one of the two communications devices to a third communications device is provided. The method includes negotiating media description between the communications device that remains in the call and the third communications device to establish a transferred call capable of handling media which can be different than that handled by the original call.

The advantages and benefits of the present invention will become apparent to those of ordinary skill in the art upon reading and understanding the following detailed description of the preferred embodiments.

BRIEF DESCRIPTION OF THE DRAWINGS

The drawings are only for purposes of illustrating preferred embodiments and are not to be construed as limiting the invention. The invention may take form in various components and arrangements of components, and in various steps and arrangements of steps, preferred embodiments of which will be illustrated in the accompanying drawings wherein.

DETAILED DESCRIPTION OF THE INVENTION

It is to be understood that the specific devices and processes illustrated in the attached drawings, and described in the following specification are simply exemplary embodiments of the inventive concepts defined in the appended claims. Hence, specific examples and characteristics relating to the embodiments disclosed herein are not to be considered as limiting, unless the claims expressly state otherwise.

Figure 1:
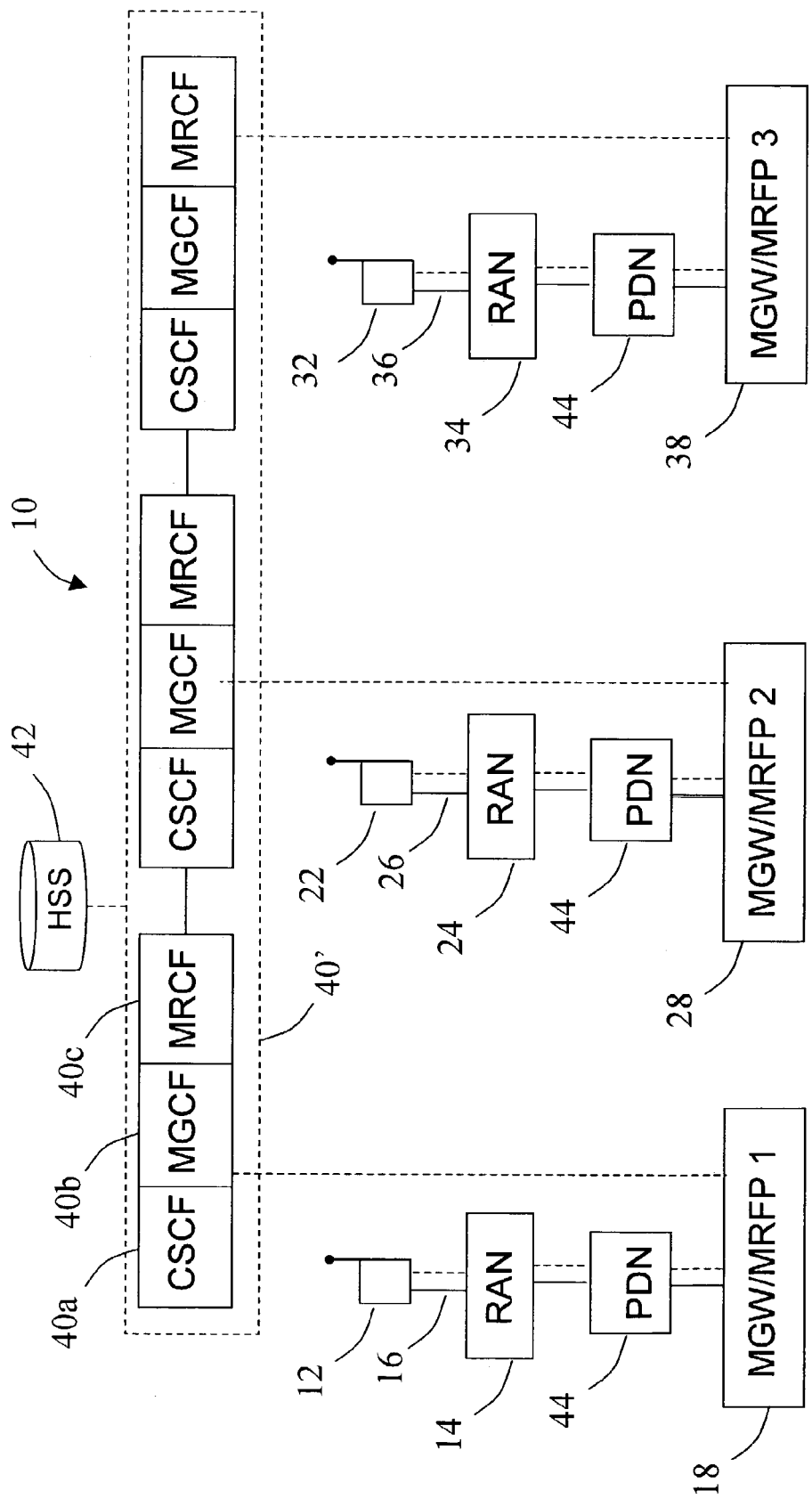
FIG. 1 is block diagram illustrating a wireless communications system in accordance with the invention.

Referring now to FIG. 1, a portion of a wireless telecommunications network is shown generally at 10 for placing mid-call transfers in accordance with the invention.

The wireless system 10 includes a first wireless communications device 12, a second wireless communications device 22 and a third wireless communications device 32. The wireless communications devices 12, 22, 32 communicate over known Radio Access Networks (RANs) 14, 24, 34 respectively via wireless interfaces 16, 26, 36. The RANs 14, 24, 34 can be any suitable RANs known in the art. The wireless communications devices 12, 22, 32 can be wireless voice devices for providing voice communication, or wireless data devices, or a combination of both, including but not limited to data capable wireless phones, for sending and/or receiving data over the wireless system 10.

RANs 14, 24, 34 are connected to Media Gateways (MGWs) and Media Function Processors MRFPs 18, 28, 38 which perform functions such as multimedia conferencing.

The media gateways 18, 28, 38 are connected to Session and Connection Controllers 40. The Session and Connection Controllers 40 provides a Call State Control Function CSCF 40a which supports and controls multimedia sessions providing flexibility to add, modify or delete bearers used by the user's services. The CSCF 40a acts as an incoming call gateway, an entry point for routing incoming calls. The CSCF 40a also executes call setups and call termination and performs state/event management.

The also provides a Media Gateway Control Function (MGCF) 40b controlling the call state for media channels on one or more Media Gateways. The Media Gateway Control Function 40b communicates with the CSCF 40a and performs conversion between 3G UMTS/CDMA network call control protocols and other existing protocols also known as legacy protocols.

The session and connection controllers also provides a Media Resource Control Function which controls the media streams and resources in the in the MRFP, interprets information coming from the CSCF and controls the MRFP accordingly. Separate session and connection controllers can be used or alternatively two or all of the session and connection controllers can integrated as shown by the dashed line 40'.

The wireless system 10 also includes a Home Subscriber System (HSS) 42 which hosts the network entity that maintains the subscriber and system related data for each subscriber corresponding to the wireless communications devices 12, 22, 32.

The Radio Access Networks 14, 24, 34 are connected to a Packet Data Network (PDN) 44 for transferring data structures to/from the media gateways 18, 28, 38 for wireless transmission to/from the wireless communications devices 12, 22, 32 in a known manner. The PDN 44 can be any suitable known packet data network using any suitable known protocol, including but not limited to, G.711, Real Time Protocol (RTP), User Datagram Protocol (UDP), Internet Protocol or any other suitable known protocol.

The media gateways are also connected to the Public Switched Telephone Network (PSTN, not shown) for providing standard telephony communication with the wireless communications devices 12, 22, 32.

Figure 2:
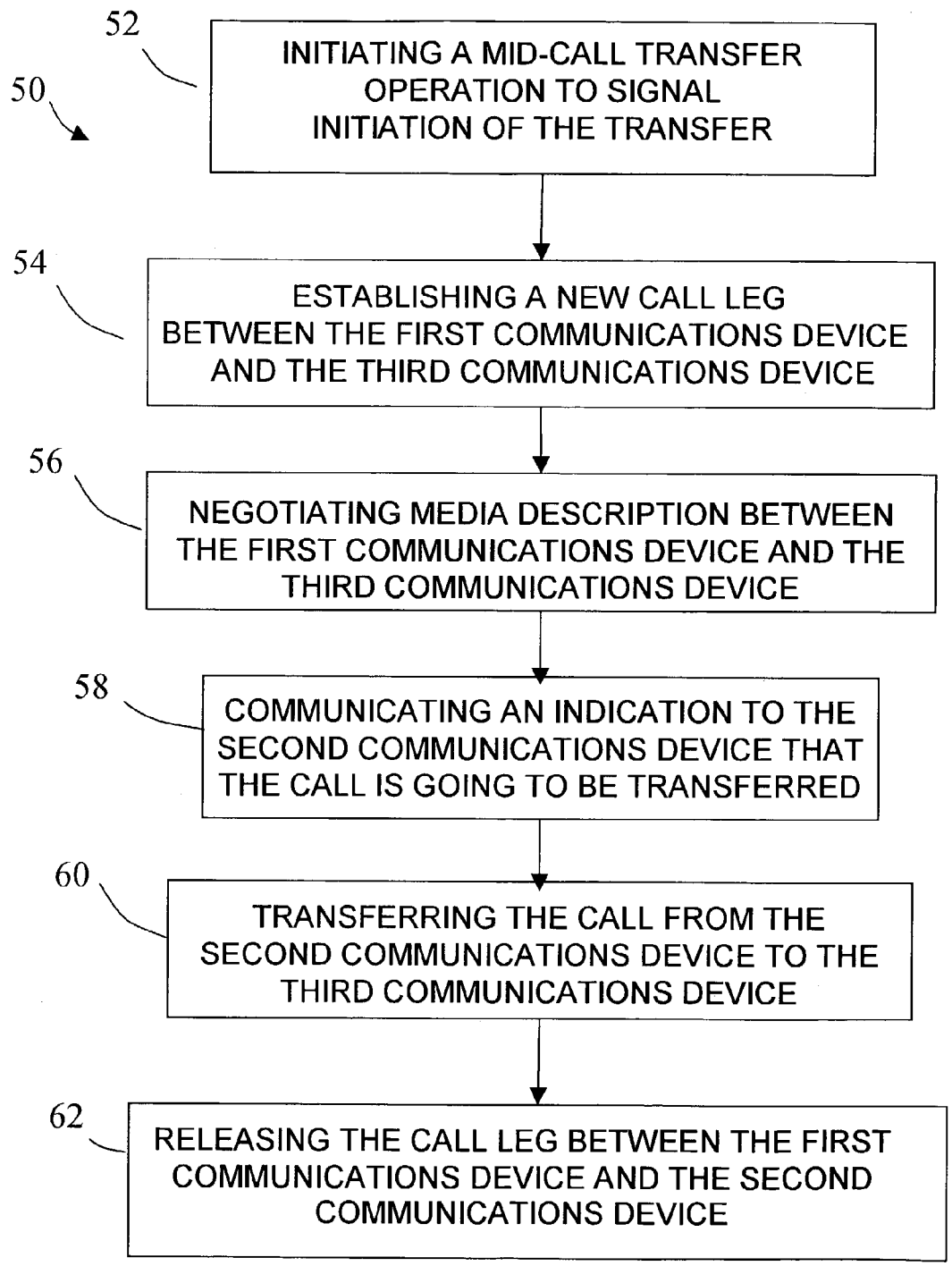
FIG. 2 is a flow diagram illustrating the method steps in accordance with the invention.

As shown in FIG. 2, the invention includes a method, shown generally at 50, of transferring a call established between a first communications device 12 and a second communications device 22 from the second communications device 22 to a third communications device 32 shown generally at 50. The first communications device 22 remains in the call and the call is transferred from the second communications device to the third communications device creating a call between the first and third communications device. Either the first 12 or the second communications device 22 can be the device which originally placed, or originated, the call. The method 50 includes initiating a mid-call transfer operation at 52 to signal initiation of the transfer. As an example, the subscriber using the second wireless device 22 intending to transfer the call can initiate the mid-call transfer operation by pressing a button on the second wireless device and then entering the Uniform Resource Identifier (URI) of the phone number of the device which the call is going to be transferred to, for example the third device 32. The URI is known a way to identify a possible end-point, server, box, webpage, etc.

This initiates a message the from second wireless device 22 to the CSCF 40a generating a query to HSS 42 to establish a new call leg, at 54, between the first communications device 12 and the third communications device 32.

The method 50 also includes negotiating media description between the communications device that stays in the call and the third communications device at 56. The negotiating step includes defining the media description parameters supported by the third communications device 22, comparing the media description parameters supported by the first and third communications devices, and choosing the desired media description parameters supported by both the first and the third communications devices for the call leg established at 54. The specific message flow will depend on the particular protocol used. The third communications device 32 can have a media description indicating that it can handle the same types of media, more types of media or less types of media than the second communications device 22. For example, the third communications device 32 can have a media description indicating that it can handle data even though the second communications device 22 cannot.

The method 50 also includes communicating an indication to the second communications device 22 that the call is going to be transferred at 58. The method 50 also includes transferring the call from one of communications device 22 to the third communications device 32 at 60.

The method 50 also includes releasing the call leg between the first communications device and the second communications device at 62.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. A method of transferring a call established between a first phone and a second phone from the second phone to a third phone to establish a call between the first and third phones, the method comprising negotiating media description bearer attributes between the first phone and the third phone, wherein the first and third phones are wireless phones.

2. The method defined in claim 1 wherein the negotiating step comprises:
    defining the media description parameters supported by the third phone;
    comparing the media description parameters supported by the first and third phones; and
    choosing the desired media description parameters supported by both the first and third phones.

3. The method defined in claim 2 further comprising establishing a call leg between the first phone and the third phone having the chosen media description parameters.

4. The method defined in claim 1 wherein the media description parameters of the second phone is different than the media description parameter of the third phone.

5. The method defined in claim 1 further comprising initiating a mid-call transfer operation to signal initiation of the transfer.

6. The method defined in claim 1 further comprising establishing a new call leg between the first phone and the third phone.

7. The method defined in claim 1 further comprising communicating an indication to the second phone that the call is going to be transferred.

8. The method defined in claim 1 further comprising transferring the call from the second phone to the third phone.

9. The method defined in claim 1 further comprising releasing the call leg between the first phone and the second phone.

10. The method defined in claim 1 wherein the second phone is a land line telephone.

11. The method defined in claim 1 wherein the second phone is a 2G wireless communications device not capable of receiving and transmitting data and the third phone is a 3G wireless communications device capable of receiving and transmitting data during the transferred call.

12. The method defined in claim 1 wherein the third phone is a personal computer.

13. A method of transferring a call established between a first phone and a second phone from the second phone to a third phone, wherein the first and third phones are wireless phones, the method comprising:
    initiating a mid-call transfer operation to signal initiation of the transfer;
    establishing a new call leg between the first phone and the third phone;
    negotiating media description between the first phone and the third phone;
    communicating an indication to the second phone that the call is going to be transferred;
    transferring the call from the second phone to the third phone; and
    releasing the call leg between the first phone and the second phone.

14. The method defined in claim 13 wherein the negotiating step comprises:
    defining the media description parameters supported by the third phone;
    comparing the media description parameters supported by the first and third phones; and
    choosing the desired media description parameters supported by both the first and third phones.

15. A method of transferring a call established between a first phone and a second phone, the second phone being incapable of receiving and transmitting data, from the second phone to a third phone capable of receiving and transmitting data, wherein the first and third phones are wireless phones, the method comprising:

initiating a mid-call transfer operation to signal initiation of the transfer;

establishing a new call leg between the first phone and the third phone;

negotiating media description between the first phone and the third phone to establish data handling capabilities in the new call leg;

communicating an indication to the second phone that the call is going to be transferred;

transferring the call from the second phone to the third phone; and releasing the call leg between the first phone and the second phone.

16. Te method defined in claim 15 wherein the negotiating step comprises:

defining the media description parameters supported by the third phone;

comparing the media description parameters supported by the first and third phones; and choosing the desired media description parameters supported by both the first and third phones.

* * * * *